United States Patent [19]

Coons

[11] Patent Number: 4,518,310

[45] Date of Patent: May 21, 1985

[54] APPARATUS FOR PREVENTING OVERSPEED OF A TURBINE DRIVE MEANS

[75] Inventor: Terry L. Coons, Dayton, Ohio

[73] Assignee: Tech Development Inc., Dayton, Ohio

[21] Appl. No.: 414,625

[22] Filed: Sep. 3, 1982

[51] Int. Cl.³ .............................................. F01B 17/06
[52] U.S. Cl. ...................................... 415/36; 415/25
[58] Field of Search ..................... 415/19, 25, 36, 41, 415/42

[56] References Cited

U.S. PATENT DOCUMENTS

| Re. 25,174 | 5/1962 | Marlin | 415/25 |
|---|---|---|---|
| 982,819 | 1/1911 | Hodgkinson | 415/36 |
| 1,990,872 | 2/1935 | Lacy | 415/36 |
| 2,467,445 | 4/1949 | Schwendner | 415/35 |
| 2,675,987 | 4/1954 | Gleason et al. | 137/49 |
| 2,957,372 | 10/1960 | Gibson | 415/36 |
| 3,180,614 | 4/1965 | Ellenberger et al. | 415/19 |
| 3,703,339 | 11/1972 | Czuszak | 415/36 |
| 4,368,004 | 1/1983 | Lapart | 415/36 |
| 4,431,369 | 2/1984 | Lucus | 415/36 |

Primary Examiner—Robert E. Garrett
Assistant Examiner—John Kwon
Attorney, Agent, or Firm—Jerome P. Bloom

[57] ABSTRACT

Apparatus associated with a component part of the drive system of a turbine assembly reduces the power applied to its drive rotor in a direct and substantially instantaneous response to the speed of its rotation rising to a predetermined level. A turbine starter for an engine embodying this apparatus comprises a housing for its rotor and the drive system of which it forms a part, a flow path for a gaseous fluid, delivered from a source, to power the rotor and a control device in connection with the drive system a component part of which moves radially thereof and, when its speed of rotation rises to a predetermined level, triggers a substantially simultaneous restriction of the flow path through which fluid can be applied to power the turbine rotor, thereby to produce a resulting reduction of the speed of rotation of the turbine drive system. If under such conditions the starter is engaged with a related engine, it will automatically disengage. The apparatus inherently and automatically prevents the occurrence of a speed of rotation of the turbine drive system which might induce self-destruction and explosive fragmentation of its housing and/or its component parts. The construction and arrangement of the control apparatus is such that the components thereof automatically reset once the speed of rotation of the starter drive system is interrupted or falls to a safe level.

7 Claims, 9 Drawing Figures

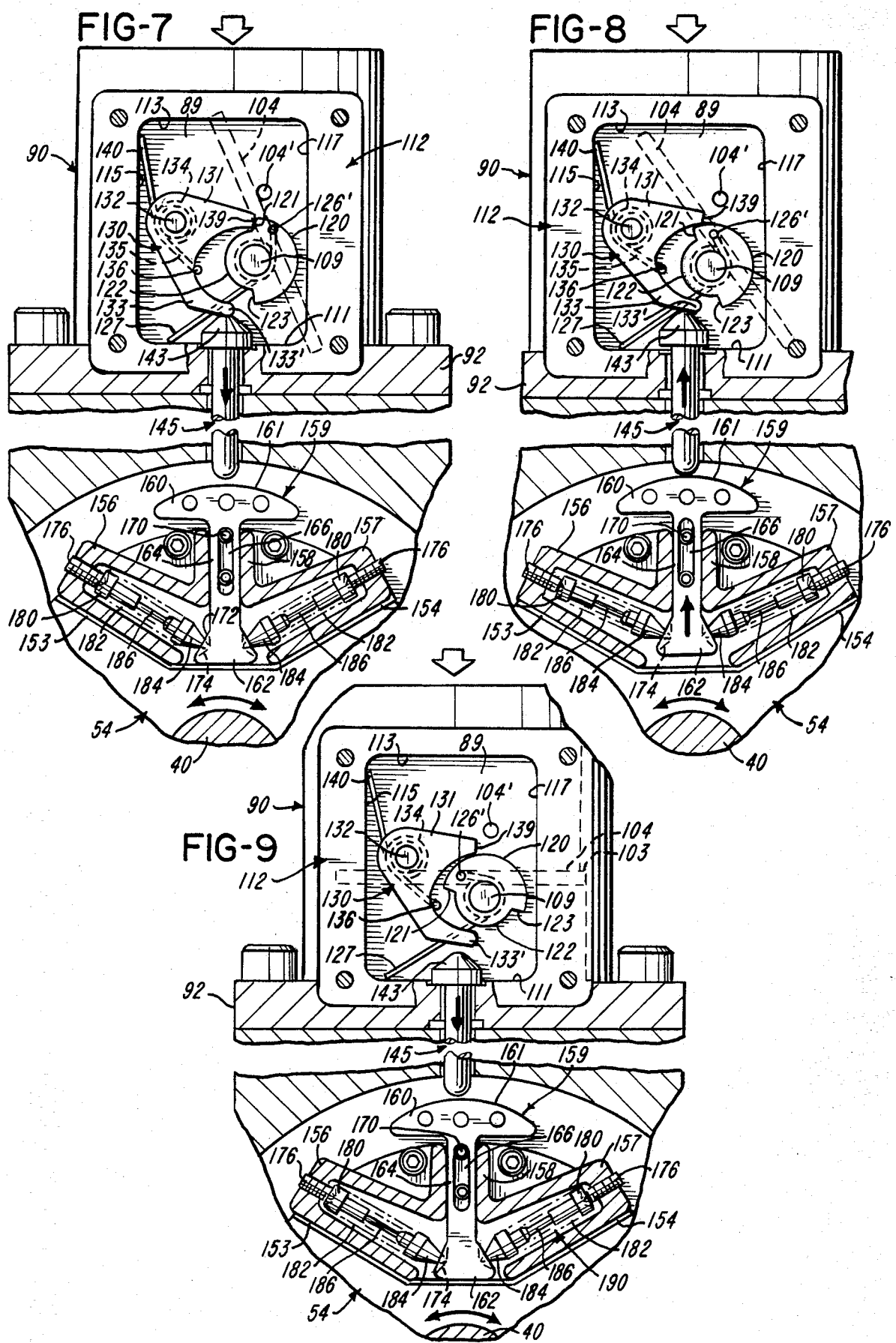

4,518,310

APPARATUS FOR PREVENTING OVERSPEED OF A TURBINE DRIVE MEANS

BACKGROUND OF THE INVENTION

This invention relates to a system and apparatus to be embodied in and in connection with a turbine drive unit which affords the ultimate in safety in its use. It will be particularly described with reference to a turbine driven starter. However, this is only for purpose of illustration and not by way of limitation, either as to its application or the form of its embodiment.

Industry has had the utmost of concern for injury to person and/or property in the use of turbine drive units. Overspeed of such a device beyond its designed limits can readily be caused to occur by misoperation, a simple inadvertent or careless act or omission on the part of an operator or an unforeseeable malfunction of the apparatus to which it is applied. Any one of these undesirable occurrences can produce disastrous consequences. A most undesirable consequence can be the self-destruction of the unit or component parts thereof,. In the use of a turbine driven starter for an engine, for example, such self-destruction can and has occurred with such explosive force as to cause fragmentation of the starter housing with resultant danger, damage and/or injury to adjacent persons and/or property.

Much time and money has been spent in efforts to find solutions to this problem, with varying degrees of success. It is believed that the best solution heretofore conceived is currently found in the Series 52A Turbine Driven Air Starter of Tech Development Inc. of Dayton, Ohio, U.S.A. The construction and arrangement of the turbine drive of this apparatus dictates a "benign" failure of the unit should the rotor of the turbine starter, for one reason or another, reach a speed of rotation beyond its designed limit.

The present invention provides an advantageous, solution to the above described problem which when embodied within a turbine driven unit, such as a starter, provides it with a very simple but positively operating control system which automatically functions as the turbine rotor reaches a predetermined speed of rotation to induce a reduction in or a substantially complete cutoff of the flow of air or other gaseous fluid being delivered to the rotor to furnish its motive power.

The inventor is not aware of any prior art which exhibits his improvements in turbine drive units, particularly in starters, which are exemplified in the present disclosure.

SUMMARY OF THE INVENTION

The present invention provides apparatus associated with a turbine drive assembly which prevents the speed of its rotation from exceeding a prescribed limit. In preferred embodiment such apparatus includes a device a control element of which rotates with and moves radially of a component part of the turbine drive system in correspondence with the speed of its rotation. Substantially at the precise point in time that its speed of rotation does reach a prescribed limit, the control element functions, through related apparatus, to substantially instantaneously induce a reduction in the flow of fluid directed to and through the turbine drive assembly to power its rotor. This prevents the operation of the turbine unit in which the invention improvements are embodied under such conditions as might cause damage to or an explosive self destructive fragmentation of its housing and/or its component parts.

In a particularly preferred embodiment thereof the invention provides a turbine starter system excessive speed of rotation of the drive system of which is prevented by control apparatus which is essentially mechanical in nature. In this instance reduction in the flow of fluid to power the turbine drive system is ultimately achieved through the medium of a control valve associated with the flow path through which the gaseous fluid is delivered form its source, under pressure, to power the turbine rotor. A significant feature of a most preferred embodiment of the invention is that the elements of the control apparatus are conditioned to automatically reset to their original positions once they ahcieve the objective of a required reduction in the speed of rotation of the related turbine drive system.

Thus, in a broad sense an embodiment of the present invention includes a turbine assembly comprising a housing, a rotor within said housing having in connection therewith a drive system which is powered thereby, means defining a flow path for delivery of gaseous fluid to power the rotor and the drive system of which it forms a part and means to substantially block said flow path or restrict the flow therethrough in a substantially instantaneous response to the speed of rotation of said drive system reaching a predetermined level.

In one embodiment of the invention the means to restrict the flow through said path includes a normally open valve which is upstream of the turbine rotor and a normally inoperative control element mounted on a component part off the turbine drive system. Also included are the means operable by the control element in a limited movement thereof, on the achievement of a predetermined speed of its rotation, to substantially instantaneously condition the valve to provide for a responsive operation thereof to inhibit movement thereby of gaseous fluid sufficient to power the turbine rotor.

A primary object of the invention is to provide improvements in turbine drive units and apparatus for control thereof which are economical to fabricate, more efficient and satisfactory in use, adaptable to a wide variety of applications and unlikely to malfunction.

Another object is to provide a turbine drive unit, for example a turbine starter, which is substantially fail safe in operation.

A further object is to provide simple mechanical apparatus for preventing a turbine drive system from exceeding a prescribed limit as to the speed of its rotation.

An additional object is to provide a turbine drive unit such as a starter with control apparatus capable of a substantially instantaneous response to a radial movement of a device in connection with a component part of the turbine drive system upon its speed of rotation exceeding a prescribed limit to reduce its speed to a safe level.

Another object is to provide a turbine drive unit, such as a starter, for example, possessing the advantageous structural features, the inherent meritorious characteristics and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents. Referring to the accompanying drawings wherein is shown one but obviously not necessarily the only form of embodiment of the invention, FIG. 1 is a longitudinal sectional view of a turbine starter embodying the features of the present invention;

FIGS. 7, 8 and 9 illustrate successive sequence of operation of the control apparatus of the present invention which is embodied in the starter of FIG. 1.

Like parts are indicated by similar characters of reference throughout the several views.

Figure 1:
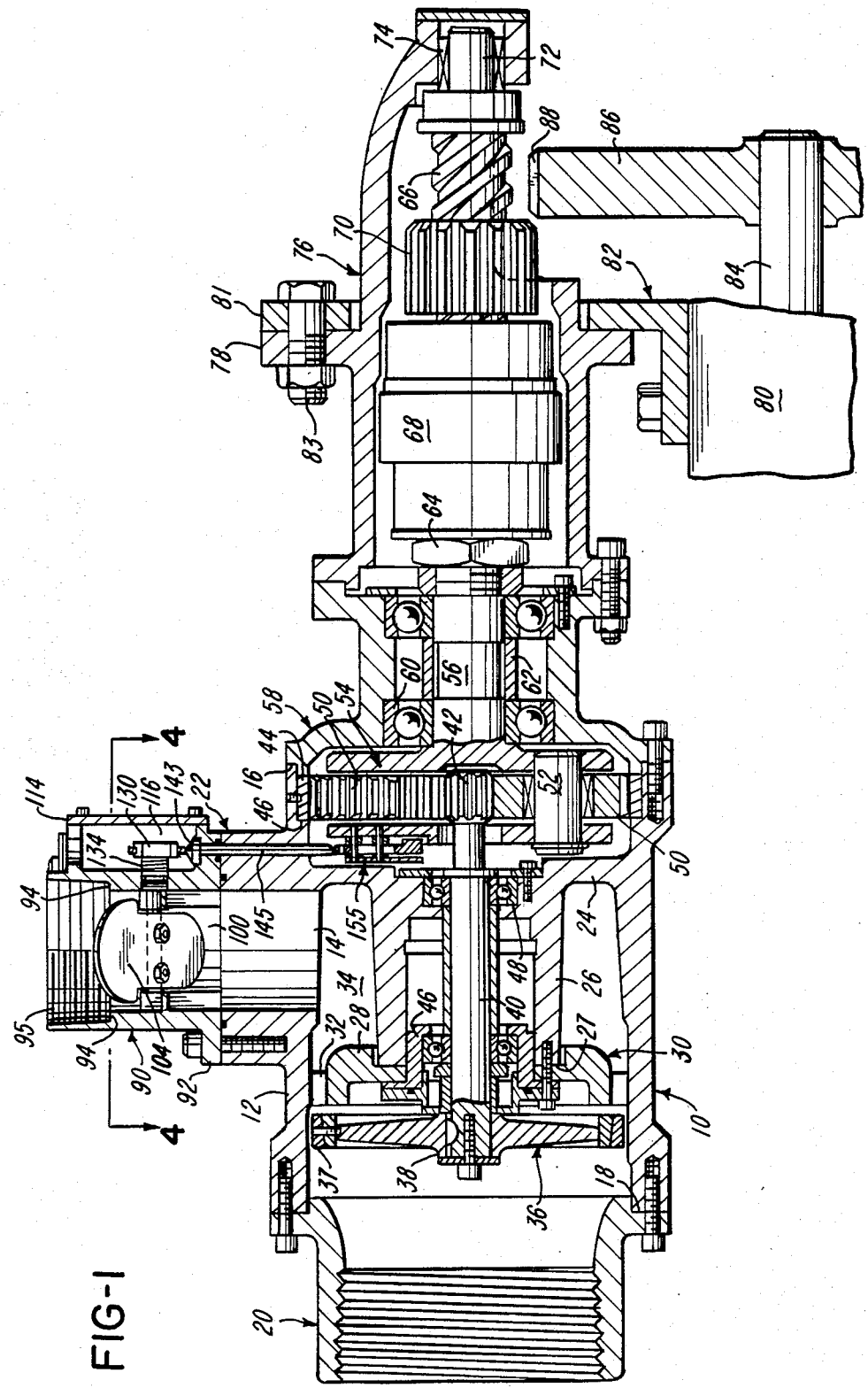
Figure 2:
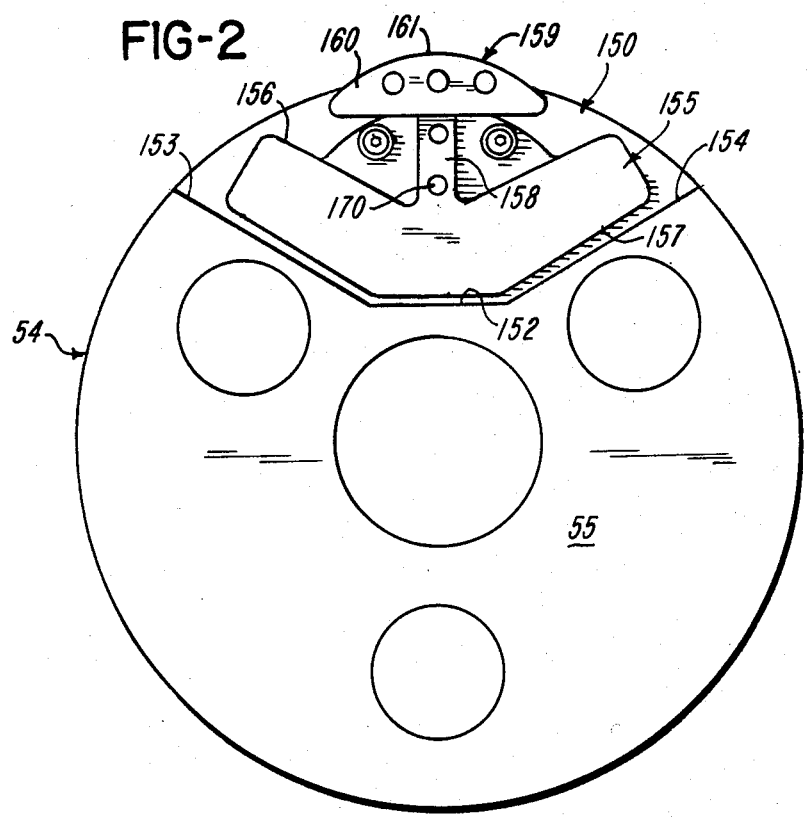
FIG. 2 is an elevation view of a control device as embodied in the starter of FIG. 1, in connection with a component part of its drive system.
Figure 3:
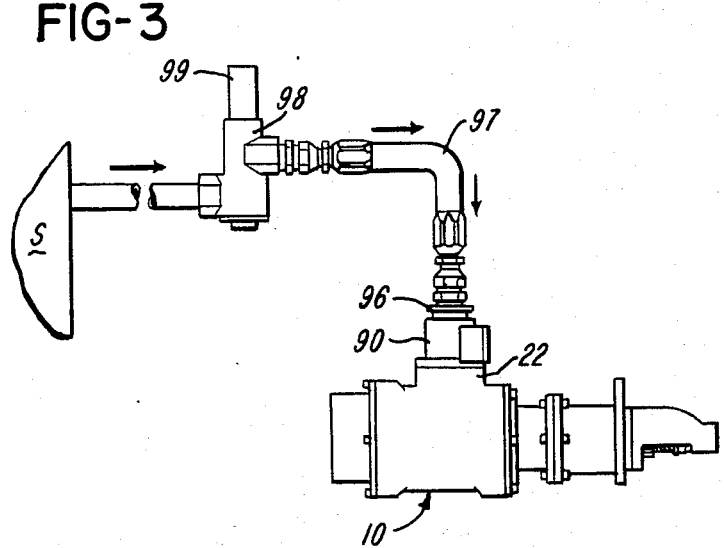
FIG. 3 is a schematic illustration of a system providing means for the delivery to the starter of FIG. 1 of a supply of fluid under pressure to furnish the motive power necessary for its turbine rotor and the drive system of which it forms a part.

FIG. 1 shows a turbine driven starter for an engine. As illustrated, the starter includes an air turbine assembly comprising a tubular housing 10 including a tubular outer wall structure 12 a radial aperture 14 in which is located in an adjacent, spaced relation to its one end 16. The opposite end 18 of the wall structure 12 is extended by a coaxial, releasably fixed, tubular exhaust pipe 20. The aperture 14 is rimmed by a tubular boss 22 integral with and projected radially of and outwardly from the wall structure 12.

Integral with the inner surface of the wall structure 12 is an annular flange 24, projected inwardly and radially thereof in a plane perpendicular to the longitudinal axis of the housing 10. The flange 24 is located at a position immediately of and to the side of aperture 14 most adjacent the end 16. A tube section 26 integral with and perpendicular to the flange 24, at its innermost edge, extends in the direction of and coaxial with exhaust pipe 20. The tube section 26 is in a concentric spaced relation to the wall structure 12 and its projected extremity terminates beyond the aperture 14 but short of and in spaced relation to the end 18.

The projected extremity of the tube section 26 nests in an end abutted relation to a shoulder 27 formed by a counterbore in the outer face of the annular base of a cup-shaped inner body portion 28 of an annular nozzle ring 30. A series of circumferentially, equidistantly and closely spaced nozzle formations 32 are integral with and projected radially from the outermost peripheral surface of the cup shaped body portion 28. The ring 30 is shrunk fit within and to the inner surface of the wall structure 12 at a location adjacent and spaced from the radial aperture 14, to the side thereof remote from the flange 24. It is also secured to and transversely of the end of the tube section 26 which it seats. The ring 30, the tube section 26, flange 24 and the section of the wall structure 12 between the flange 24 and the nozzle ring define an annular chamber 34. The only inlet to the chamber 34 is provided by the aperture 14 and the only outlets from this chamber are those defined by the nozzles 32 of the ring 30.

Beyond the ring 30, in the direction of the end 18, the internal cross sectional area of the wall structure 12 is slightly expanded, in stepped fashion. Located within this expanded portion of the inner surface of the wall structure 12, in an adjacent, closely spaced, substantially parallel relation to the nozzle ring 30, is a turbine rotor 36, the rotor buckets 37 of which are aligned with the nozzles 32 and in a closely spaced relation to the inner surface of wall structure 12. The rotor 36 has a central hub portion 38 about and keyed to one end of a drive shaft 40, the longitudinal axis of which conincides with that of the housing 10. The shaft 40 extends from the rotor 36 through the nozzle ring 30, the tube section 26 and the flange 24 to have its opposite end, to which is fixed a pinion 42, terminate just short of the end 16 of the wall structure 12. The portion of the inner surface of the tubular wall structure 12 extending from the flange 24 to the end 16, has its diameter expanded in stepped fashion in the direction of and to the end 16.

One end face of a stationary internal ring gear 44 is seated to an outwardly facing shoulder 46 provided by the stepping of the inner surface of the wall structure 12 at the end 16. The gear 44 is secured to the wall structure 12 to position about and in a concentric spaced relation to the pinion 42.

The shaft 40 is supported for rotation in bearing assemblies 46 and 48 which are longitudinally spaced and contained and mounted by a suitable structure within the limits of the tube section 26. Suitable retainers are applied which not only establish the positions of the bearings and the cup shaped base portion 28 of the nozzle ring 30 but also prevent movement of the rotor 36 axially of the shaft 40. In the starter shown in FIG. 1 seals are provided about the shaft 40, in connection with the retainer structure and within the cup shaped base of the nozzle ring to commonly inhibit the passage of the fluid employed in the drive of the rotor 36 to and about the shaft 40 and to the power transmitting structure to which it connects. The particular construction and arrangement of the seals, retainers and bearing assemblies are not described since in and of themselves they may be contrived in any suitable fashion well within the comprehension of those versed in the art, given the present disclosure and the knowledge of the prior art.

As will be seen, the location of the rotor 36, and correspondingly its buckets 37, is such to place this structure immediately of and in a closely spaced relation to the one end of the housing defined by the end 18 of the wall structure 12 providing its exhaust outlet which opens directly to the inlet to the exhaust pipe 20.

The pinion 42 (FIG. 1) is located intermediately of and in a nesting driving engagement with circumferentially spaced gears 50, the latter of which mesh with the teeth of the stationary internal ring gear 44. The gears 50 are suitably mounted for free rotation on pivot pins 52 which bridge axially spaced end walls of a cage 54 integral with and providing an expanded head at one end of a shaft 56, which, in effect, forms a coaxial extension of the shaft 40. The cage 54, in part, and the shaft 56 are located within a short tubular housing 58 which is in a generally concentrically spaced relation thereto. One end of the housing 58 is enlarged as to its interior diameter and shaped to cup around the portion of the cage 54 which projects outwardly of the end 16 of wall structure 12 and has its projected extremity fixed by screws in an end abutted relation to the end 16 and the outer face of the ring gear 44. The latter is thereby fixed to the shoulder 46.

The shaft 56 is supported by and for rotation in longitudinally spaced, suitably retained bearings 60.

The pinion 42, gears 50 and gear 44 are constructed and arranged to provide a planetary gear reduction stage in the transmission of power from the rotor 36 to and through the shaft 56 to a prime mover.

To the end of the housing 58 remote from the cage 54, the shaft 56 is provided with an external thread about which are applied a pair of conventional, relatively abutted, nuts 64. The nuts 64 lock the inner races of the bearings 60 and a spacer 62 therebetween in end abutted relation to each other and to the expanded head provided by the cage 54.

As should be obvious, on drive of the rotor 36 the cage 54 and shaft 56 will resultingly be driven and have a speed of rotation which is relatively reduced from that of the rotor 36. The threaded end of the shaft 56 which is remote from that end embodying the cage 54 projects beyond the nuts 64 to have a keyed engagement with and a driving relation to a coaxial output shaft 66 through an intervening assembly 68 constituting an overload friction clutch. Shaft 66 is distinguised by a helical thread having a relatively high lead angle and it is threadedly engaged by an output pinion 70 having a complementary internal thread.

As is known, the pinion 70 will normally position on the shaft 66 immediately adjacent the output side of the clutch assembly 68. The outermost projected end portion 72 of the shaft 66, which is free of thread, is mounted for rotation within a bearing unit 74 supported and contained in the outermost end of a tubular structure 76 which houses the shaft 66, the friction clutch unit 68 and the portion of the shaft 56 which is engaged to form a driving element for the clutch unit 68 in its engaged condition. The housing 76 is formed and mounted to have its inner wall surface in a concentric closely spaced relation to the structure which it contains and has one end thereof abutted and bolted to the end of the housing 58 remote from that end which is abutted to the end 16 of the outer wall structure 12 of the housing 10. The housing 76 is thereby fixed to be coaxial with the housings 10 and 58.

The housing 76 has a streamlined configuration which provides support for the shaft 66 at its outermost extremity 72. The housing 76 is cut away at what may be considered the bottom of its outermost end portion to expose the under portion of the shaft 66 and its threadedly engaged pinion 70.

The starter is schematically illustrated in application to an engine 80 to have the projected end portion of the housing 76 thrust through an aperture in an arm 81 of a bracket 82 which is fixed to and projects from and generally radial to the engine. The housing 76 is provided with an external flange 78 which abuts the arm 81, to which it is fixed by the application of bolts and nuts 83 in a manner believed obvious from FIG. 1 of the drawings. The starter, so mounted in connection with the engine 80, is fixed so that the shaft 66 is parallel to the engine drive shaft 84. The drive shart 84 mounts the engine flywheel 86 in such a position that the gear teeth 88 on and defining the peripheral limit of the flywheel include a portion thereof positioned normally in an axially spaced relation to and in a direct alignment with an outer peripheral portion of the teeth of the pinion 70. The aforementioned structure described with reference to FIG. 1 of the drawings corresponds to that known and found in the prior art and is detailed only to the extent necessary for an understanding of the present invention. The details of the embodiment of the improvements of this invention as herein illustrated now follow.

The boss 22 is extended in a direction outwardly of the housing 10 by a short coaxially related tube 90. A flange 92 at one end of the tube 90 is secured in an end abutted relation to the outermost end of the boss. Tube 90 is so sized and configured that the major portion of the length of its inner wall surface is aligned with and forms a coaxial extension of the inner wall surface of the boss 22. The outer end of the tube 90 has a counterbore 94. The portion 95 of the inner surface of tube 90 immediatedly bounding the counterbore 94 is threaded, for the coupling thereto of an adapter 96 at the delivery end of a line 97 leading from a source S of gaseous fluid, such as air, for example, under pressure, which is used to power the turbine rotor 36.

A main valve 98 is inserted in the line 97 between the source S and the inlet end of the tube 90. The valve 98 is operated through an actuator 99 which is in a circuit including a normally open switch (not shown). When the switch is open, the valve 98 is closed, preventing flow of the gaseous fluid from its source to the chamber 34 and the rotor 36. When the switch is closed, the actuator 99 is energized, causing the valve 98 to open, at which point fluid under pressure moves from the source S to and through the delivery line 97, tube 90, boss 22, chamber 34 and nozzles 32, to impinge upon the buckets 37, thereby to energize and drive the rotor 36. A groove 100 formed in the inner wall surface of the tube 90 extends from its end including the flange 92 to a point just short of a pivot shaft 102, to terminate as to its length in a shoulder 103 facing outwardly of the tube 90 in the direction of the boss 22. The shaft 102 extends transversely of and in bridging relation to the passage through the tube 90 in a line parallel to and offset from a diametral plane thereof, the offset being in the direction of the portion of the inner wall surface of the tube 90 which embodies the groove 100. A butterfly valve plate 104 mounts in fixed connection with and generally tangential to the shaft 102 intermediate its ends. In the closed position thereof the plate 104 extends crosswise to the tube 90. In the example illustrated in the drawings the plate 104 almost fully blocks the passage in a closed position. However, it does leave room for passage thereby of a limited amount of fluid under pressure.

One end of the shaft 102 is contained for rotation in a bearing socket 101 formed in connection with the inner wall surface of the tube 90. The shaft 102 extends from the socket 101 to pass through and bear for rotation in a bearing 107 and a seal 110 arranged in following relation in an aperture 108 in the tube 90 which is aligned with and diametrically opposite the bearing socket 101. The portion 109 of the shaft 102 remote from the socket 101 which projects outwardly of the tube 90 is successively reduced in diameter. The portion 109 lies within and in spaced relation to the inner wall surface of a shallow tubular wall structure 112 formed integral with and projected outwardly from the tube 90 at the side thereof most adjacent the end 16 of the housing 10. The wall structure 112 is rectangular in cross section and has its outermost end bridged and capped by a releasably attached plate 114. The wall structure 112, the outer surface portion 89 of the tube 90 which it bounds and the plate 114 define a chamber 116, access to which is provided by removal of the plate 114.

For purposes of this disclosure the inner side wall surface portions of the structure 112 which peripherally bounds the chamber 116 will be respectively identified by the numerals 111, 113, 115 and 117. Considering FIGS. 1 and 7 of the drawings, the orientation of the inner side wall surface portions of the wall structure 112 provides that the side 111 is most adjacent the housing 10, being located in substantially the plane of the outermost surface portion of the flange 92; the side 113 is most remote and spaced outwardly from and parallel to the side 111; and the sides 115 and 117 which bridge the sides 111 and 113 are in parallel spaced relation and lie in planes which transversely intersect the housing 10. As particularly seen in FIG. 7, side 117 is in a plane spaced to the rear of the shaft 102 mounting the valve plate 104 and side 115 is outwardly and more remote from the shaft 102, as may be clearly seen.

The projected extremity of the end portion 109 of the shaft 102 terminates short of the projected extremity of the wall structure 112 and mounts thereon, in fixed relation thereto, a cam plate 106. The cam 106 is located in a parallel spaced relation to the plate 114 and spaced outwardly from the surface 89.

The outer peripheral edge surface of the cam 106 is so configured in profile as to include two 180° arcs 120 and 122, each formed on a uniform radius but each having a different radius the center of which in each case coincides with the center of the aperture in the cam 106 which accommodates the projected extremity of the shaft 102. The arrangement of the arcs 120 and 122 is such to provide that their diametrically opposite ends are in a common line including the center of the aperture in the cam and that their respectively adjacent ends are radially offset. The adjacent radially offset end portions of the remote ends of the arcs 120 and 122 are joined by surface portions which are co-planar and arranged to form a pair of diametrically spaced shoulders 121 and 123 on the outer edge of the cam 106.

Having regard for the axial length of the tube 90, the shaft 102 is positioned therein at a location relatively adjacent and spaced from the end thereof including its flange 92. This locates the shaft portion 109 parallel to and more closely adjacent the side wall 111 than the side wall 113 and adjacent and parallel to the side wall 117 of the chamber 116.

With the valve plate 104 in its normally open position, as determined by its abutment with a pin 104' suitably positioned and fixed in connection with the tube 90, the arc portion 120 of the outer peripheral edge of the cam 106 is in a directly facing relation to the side 117 of the chamber 116.

As will be seen with reference to the drawings, the groove 100 accommodates the swinging of the valve plate 104 to its closed position, in which event the shoulder 103 serves as a limiting abutment for an edge portion thereof.

The butterfly valve plate 104 is biased, normally, to its open position by a spring 125. The spring 125 is coiled about the shaft 102 between the tube surface portion 89 and the cam 106. The one end portion 126 of the spring 125 which is adjacent the cam 106 projects tangentially of the shaft 102 to have a right angled extremity 126' thereof project through an aperture in the body of the cam 106 which is parallel to and displaced radially from the shaft 102 to locate in an adjacent parallel relation to a portion of the outer edge of the cam defining the arc 120 and closely adjacent the one end of this arc which merges with the radially outermost limit of the shoulder 121. Note that in the normally open position of the valve plate 104 the plane of the shoulders 121 and 123 on the outer peripheral edge of the cam 106 is perpendicular to and the shoulder 121 most remote from the plane of the side 111 of the chamber 116. The opposite end portion 127 of the spring 125 projects from and tangential to the shaft 102 in an adjacent bearing relation to the surface 89 and in a manner to incline in the direction of and have its projected extremity bear on the side 111 at a position closely adjacent the side 115 of the chamber 116. As may be seen with reference to FIG. 7 of the drawings, the spring 125 normally biases the cam 106, and correspondingly the shaft 102 and the valve plate 104, in a clockwise direction. This is what influences the valve in the tube 90 to normally remain in an open condition, absent flow of fluid under pressure from the source S to the rotor 36 by way of the tube 90. As may be seen from FIG. 7, the angular relation of the plate 104 in its normally open position is such, however, that should fluid under pressure be applied to the tube 90, it will cause a closing of the valve plate 104 absent a restraining influence which in this case is provided by a U-shaped lever 130.

The lever 130 is mounted for rotation on the body of a bolt 132 anchored in and projected outwardly from the tube surface portion 89 and into the chamber 116 in a parallel spaced relation to the portion 109 of the shaft 102. The bolt 132 positions adjacent and parallel to the side 115 and parallel to and more closely adjacent the side 113 than the side 111 of the chamber 116.

The lever 130 mounts for rotation on and relative to the body of the bolt 132 with one face thereof held in abutting bearing relation to the expanded head of the bolt which is innermost of the chamber 116 by a spring 134 coiled about the body of the bolt between the lever and the surface portion 89.

With the valve plate 104 in its open position, as shown in FIG. 7, one end portion 135 of the spring 134 is extended tangential to the body of the bolt in the general direction of the side 111 as well as in the general direction of the cam 106 to have a hook 136 formed by its projected extremity engage about the edge portion of the arm 133 of the lever 130 adjacent the base of the inner surface of its U shape. The other end 140 of the spring 134 is extended tangential to the body of the bolt adjacent the surface portion 89 to form a very small acute angle with and have its projected extremity bear on the side portion 115 immediately adjacent the side portion 113 forming part of the peripheral boundary of the chamber 116.

The bias of the spring 134 so applied is such to normally induce the arm 131 of the lever 130, which is outermost from the housing 10 with the valve plate 104 in its open position, to place the flat surface 139 of its projected extremity immediately of and in opposing relation to the shoulder 121 on the outer periphery of the cam 106. As may be seen from FIG. 7, the arrangement is such that as long as the arm 131 is directly opposite an interfering with the movement of the shoulder 121, the cam 106 and correspondingly the shaft 102 and the valve plate 104 cannot be moved in a counterclockwise direction under the influence of the pressured flow of air which moves from the source S to and through the tube 90, even though the plate 104 does in the open position thereof present a surface portion in the path of the pressured flow of fluid.

The arm 133 of the lever 130 has a relatively flat outer side edge portion 133' which in the position of the lever just described and shown in FIG. 7 bears on the apex of a conically shaped expanded head portion 143 of a trip rod 145. The body of the rod 145 projects through an aperture in the side 111 of the wall structure 112 centered between the sides 115 and 117. This aperture extends through the flange 92 and through an aligned aperture in and the axial length of the boss 22 and inwardly of the housing 10 in an area of its interior immediately of the flange 24, from which it is closely spaced and to the side thereof most adjacent the cage 54. The end of the aperture in the side 111 which opens to the interior of the chamber 116 is counterbored to provide a recessed shoulder which seats the expanded head 143 of the rod 145 under the influence of the bias normally placed thereon through the medium of the lever 130.

A shallow recess 150 is formed in the face 55 of the cage 54 most adjacent the flange 24. The recess 150 has a bounding wall surface the radially innermost portion 152 of which is spaced radially outward of the center of the face 55 and at right angles to and projected equidistantly from each of the opposite sides of a radial plane of the cage 54. The wall surface bounding the recess 150 is completed by portions 153 and 154 thereof which connect at their innermost ends to the respectively remote ends of the portion 152 and extend outwardly therefrom, in a symmetrically divergent, relation to the outer peripheral edge of the face 55.

A housing 155 is fixed to and projected outwardly from the base surface of the recess 150 and the face 55 of the cage 54.

The housing 155 defines a pair of symmetrically divergent hollow elongated arms 156 and 157 which follow the line of and are in adjacent generally parallel relation to the surface portions 153 and 154, respectively, of the wall which bounds the recess 150.

The outermost ends of the arms 156 and 157 are closed. However, their innermost ends are open and they commonly open to respectively opposite sides of a space radially innermost of a third hollow arm 158 formed by the housing 155 which is oriented radially of the face 55, open at each of its opposite ends, centered between the arms 156 and 157 and directly aligned with the trip rod 145.

A relatively flat plate defining a hammer element 159 is contained by and bears within and for movement relative to the arm 158 to have one end portion 160 project from the outer limit of the arm and the other end portion 162 dispose in the space between the openings to the innermost ends of the arms 156 and 157. The body portion 164 of the element 159 intermediate its end portions is relatively narrow, rectangular in cross section and has therein an elongate slot 166 running lengthwise thereof and centered between and parallel to its sides. A pair of dowels 170 are thrust through apertures 167 in the arm 158 of the housing 155 and the slot 166 and engaged in aligned recesses in the base of the recess 150. The dowels 170 are longitudinally spaced and the distance therebetween is less than the full length of the slot 166. As should be self-evident, the dowels 170 serve as guides for and maintain the alignment of the hammer element 159 in the course of its movement inwardly to and outwardly from the housing 155.

The end portion of the hammer element 159 which is radially innermost of the housing 155 and in the space radially inward of the arm 158 is laterally expanded by having its sides diverge to and in the direction of its innermost extremity. This divergence is such to present, at the open inner end of each arm 156 and 157, when the hammer element 159 is in an inoperative position, a surface 172 which is in a longitudinally spaced facing, parallel relation to the inner surface of the closure at the outer end of the interior of the arm which the surface 172 faces. Each surface 172 is provided with a centrally located conically shaped recess 174.

The outer end 160 of the hammer is formed to provide it with a laterally expanded head the outermost surface 161 of which is smoothly arcuate, formed on a uniform radius and projected equally to either side of the center line of the hammer element. The radially innermost surface of the hammer head is defined by generally co-planar surface portions thereof which extend laterally outward from the sides of the body portion 164, at right angles thereto, and join at their outer ends to the outer extremities of the arcuate surface 161.

The closed end of each of the arms 156 and 157 has a central tapped hole by means of which there is applied thereto a screw 176. The innermost end of the screw 176 is conically formed and projects inwardly of the related arm to nest and bear in a relatively large conical recess 178 in the base of an adapter 180. An oppositely facing shoulder 181 of the adapter 180 provides an abutment for one end of a coil spring 182. The opposite end of the spring 182 is abutted and biased to the base of a conical element 184 serving as the head of a rod 186 the inner end of which is suitably coupled in the end of the adapter 180 remote from the screw 176. As here provided, the elements 180, 182, 184 and 186 are constructed and arranged to serve as a spring assembly 190.

The spring assemblies 190 normally are each oriented at right angles to one of the opposite divergent side surface portions 172 of the hammer 159 with the apex of the head 184 centered in and bearing on the apex of the base wall of the recess 174. Also, in each case, and to each side of the hammer, the assembly 190 has a bearing pivotal mount on the conically shaped inner end of the related screw 176. As so applied the spring assemblies 190 serve to normally bias the hammer element 159 to its radially innermost position with reference to the housing 155 and the cage 54. The purpose of this will soon be obvious.

Prior to the time of use the starter above described and illustrated in the accompanying drawings, the relative positions of the respective components thereof will be as shown in FIGS. 1 and 7 of the drawings. Under such condition the valve plate 104 will be in an open position and the switch (not shown) for controlling the actuator 99 will be open. To initiate the starting of the related engine, the normally open switch of the circuit embodying the actuator will be closed, thereby to energize the actuator and open the valve 98. As this occurs, the fluid under pressure which is provided in the source S will move to and through the valve 98, the delivery line 97, the tube 90, boss 22, chamber 34 and nozzles 32 and be caused to impinge upon the buckets 37 of the rotor 36, thereby to drive the rotor and the drive system of which it forms a part. This drive system includes the cage 54. As here provided the cage 54 will rotate at a speed which is reduced relative the speed of rotation of the rotor 36. Attention is directed to the fact that though the valve plate 104 is in part in the path of the fluid moving from the upstream to the down stream side thereof, it is prevented from a responsive counterclockwise rotation by the position of the lever 130, the arm 131 of which is at this time biased into a blocking relation to the shoulder 121 of the cam plate 106. The restraint thus provided insures that there will be a flow of fluid under pressure to furnish the motive power necessary to drive the turbine rotor and the drive system described, at a speed of rotation to cause the pinion 70 to move into engagement with and couple the turbine drive system in a driving relation to the engine flywheel 86.

Normally, as soon as the engine is started, the operator or responsive apparatus which controls the switch holding the actuator energized will release this switch and concurrently therewith, due to the reducing speed of rotation of the screw 66, as the valve 98 responsively closes, the pinion 70 will withdraw and disengage from the engine flywheel 86. Should, however, the switch closing the circuit to the actuator 99 remain in a closed condition after the engine is started, due either to the negligence of the operator or a malfunction in operating equipment, and the pinion 70 accordingly remain engaged with the engine flywheel, there can be a back drive of the turbine drive system at a speed of rotation causing it to approach and reach a level beyond its designed limits. Should this occur, there obviously can be destruction of and/or damage to the starter parts. However, by virtue of the inclusion of the apparatus of the invention, in any case that the turbine drive system does reach the level of what has initially been set as a limit for a safe speed of its rotation, the hammer 159 will move radially outward of its housing sufficiently to sharply and forcefully engage and drive the rod 145 inwardly of the chamber 116. The spring assemblies 190 will be so set and rated to provide for the necessary degree and speed of movement of the hammer at the appropriate speed of the rotation of the cage 54. As this hammer movement occurs, referring to FIGS. 7 through 9 of the drawings and in particular FIG. 8, it will be seen the lever 130 is forced to rotate counterclockwise under the influence of the direct axial movement of the head 143 of the rod 145 which bears on the surface 133' of the lever arm 133. The counterclockwise movement of the lever 130 so induced causes the arm 131 to clear the shoulder 121 of the cam 106. As this occurs the pressure applied by the gaseous fluid moving from the source S will be sufficient to overcome the bias on the valve plate 104 by the spring 125 and to force the plate 104 into a substantially bridging and blocking relation to the passage for the fluid which is normally defined by the tube 90. At the same time (FIG. 9) as the valve plate 104 is moved to its "closed" position, the inherent rotation of the shaft 102 therewith provides for rotation of the cam 106 sufficient to provide that the arcuate edge surface portion 120 thereof rides under arm 131 and within the open end of the lever 130.

Figure 4:
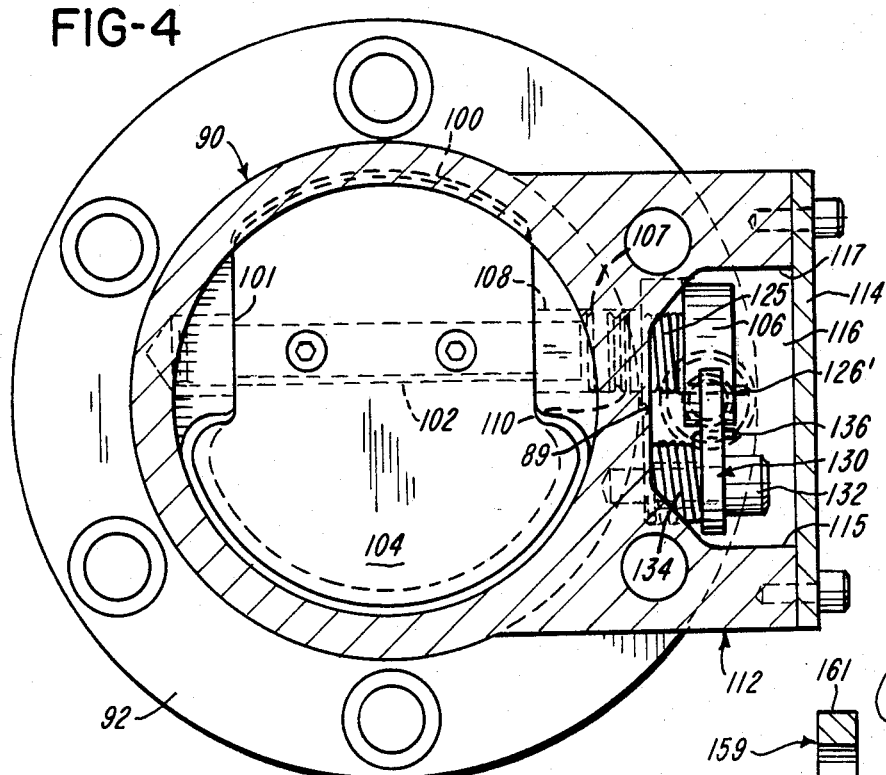
FIG. 4 is a view taken on line 4—4 of FIG. 1, differing, however, in that it illustrates the butterfly valve of FIG. 1 in a position which restricts the flow thereby of fluid under pressure, which is in contrast to the showing of the valve in an open position, as indicated in FIG. 1.
Figure 6:
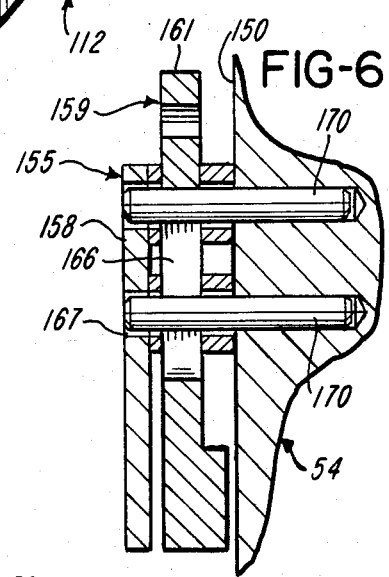
FIG. 6 is a view taken on line 6—6 of FIG. 5.
Figure 5:
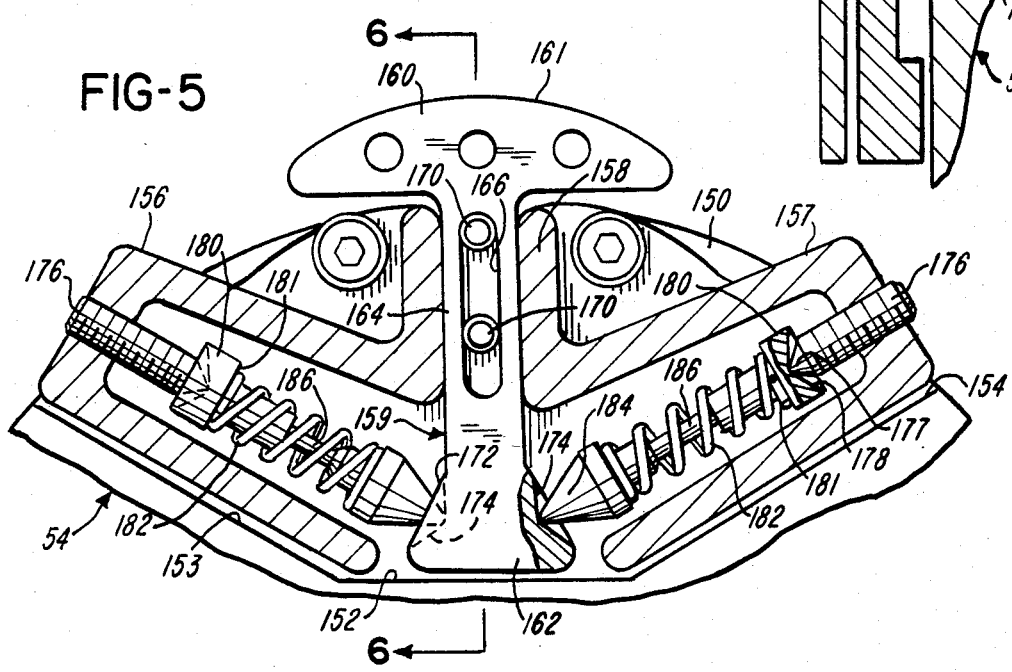
FIG. 5 is a view of the control device illustrated in FIG. 2 on a relatively enlarged scale and with the housing of the device shown in section to illustrate, fully, its component parts.

In the case illustrated (FIG. 4) in a closed position thereof the valve plate 104 does not fully block the passage through the tube 90. It leaves sufficient space peripherally thereof to provide for the passage thereby of a limited amount of the upstream fluid which may then move and provide, to the extent thereof, a rotational impulse to the rotor 136. The amount of space peripheral to the valve plate 104, in a closed position thereof, will depend upon its application. In certain instances the amount of fluid which passes to the rotor may be sufficient to drive the rotor, but at a reduced speed, one which is within safe limits.

Tests of invention embodiments such as herein illustrated exhibit the fact that when the cage 54 rotates at a speed sufficient to induce the radial outward movement of the hammer 159, the movement of the hammer is so rapid that there is, in effect, a snap action thereof which occurs at the instant that the cage reaches that speed of rotation at which the hammer is prescribed to so move. As will be well apparent, the use of the mechanical arrangement illustrated facilitates the setting of the spring assemblies 190 so the hammer will function in the prescribed manner and at the prescribed time. The outward movement of the hammer 159 at the critical limit of the speed of rotation prescribed for the turbine drive system is accommodated by a slight angular pivoting movement of the spring assemblies 190 with respect to the conical heads of the screws 176 on which they are based. In the course of this slight angular movement the spring assemblies are conditioned to store energy so that they may inherently retract the hammer element to its original inoperative position as soon as the speed of rotation of the cage 54 and the turbine drive system of which it forms a part falls below the preset critical limit. Due to the direct throw of the rod 145 responsive to the outward movement of the hammer element which sharply strikes it, there is no delay in inducing the lever 130 to function substantially instantaneously and concurrently therewith and there is a substantially instantaneous closing of the valve plate 104. It is to be understood, of course, that when there is a reference to the "closed" position of the valve plate 104, in the embodiment illustrated this is not a total closure of the flow path for the fluid under pressure which moves from the source S to the rotor 36 when it is required that the rotor be energized.

The mechanical apparatus for inducing the results described is very simple. Its function is direct and without time lag. Of course, the angular relation of the valve plate 104 in the open position thereof, as related to the flow of fluid under pressure through the tube 90, is set to contribute to the optimal and immediate function thereof, as and when necessary.

An interesting point in the arrangement where the plate 104 does not completely block the flow path through the tube 90 is that the leakage or limited passage of fluid past the plate 104 relieves the buildup of upstream pressure and, with a closing of the valve 98, as soon as upstream pressure is relieved to the point that the bias of the spring 125 can overcome the upstream pressure or responds to the lack of such pressure, it will promptly and automatically reset the valve plate to its open position. Correspondingly, the various other elements embodied as part of the control apparatus will also mechanically and automatically reset in a manner made obvious by the foregoing description.

If there is a load on the starter, the arrangement provided can cause the turbine drive system to stop its rotation immediately as the invention control apparatus functions. If there is no load on the turbine, the turbine drive system will run at a very safe coasting speed, well below the critical speed of rotation which would endanger the integrity of the construction of the starter and its component parts.

Accordingly, in the use of the invention apparatus as illustrated, the starter is induced to automatically disengage itself from the engine irrespective of whether or not a control switch providing for opening of the valve 98 remains closed and such may be made to occur in accordance with the physical nature and composition of the starter in a manner which should be obvious. Furthermore, in the preferred embodiment illustrated the control apparatus of the invention is arranged and conditioned to automatically reset so as to be ready for reuse as and when required.

In the case of the use of a turbine drive system embodying the invention above described in other than a starter, it should be clearly seen that one can by an appropriate modification of the form or conditioning of the valve plate 104, or its equivalent, selectively limit the rate and amount of fluid under pressure which moves through the tube 90 the rotor 136, thereby to provide for a selective control of the maximum speed of rotation which the turbine drive system may achieve.

In any case the invention enables a turbine drive system which is insured that when the speed of its rotation and the component parts thereof reaches a certain level, there will be an absolute and direct instanteous operation of its controls resulting in a selective reduction or substantial complete cutoff of the motive power available to the drive system.

In summary the invention in its preferred embodiment affords a simple mechanical arrangement enabling an optimal and positive advantage, namely the lending of a high degree of safety in the use of devices embodying a turbine drive system, particularly devices of the nature of that illustrated.

It should be clear, therefore, that while the invention is shown in its most advantageous application to a starter, its application need not be so limited.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A turbine assembly including a housing, a rotor within said housing having a drive system in connection therewith and forming a part thereof, means defining a flow path for the delivery of gaseous fluid under pressure and the application thereof to power said rotor characterized by valve means, control means in connection with a component part of said drive system, said control means including an element having an orientation which is substantially radial to said component part, means constructed and arranged to normally hold said element in a relatively retracted position with reference to said part and to provide for its substantially radial movement outwardly of said component part in a substantially instantaneous response to the speed of rotation of said rotor exceeding a predetermined limit, to condition said valve means to move across and to obstruct at least a portion of said flow path sufficiently to diminish the application of said fluid to power said rotor and produce an immediate reduction of its speed of rotation and that of its drive system and correspondingly that of said component part thereof without interrupting the application of power to said rotor.

2. A turbine assembly as in claim 1 embodied in and forming part of a starter for an engine wherein said housing has an inlet and means defining therein and in connection with said inlet a portion of said path for flow of said fluid under pressure and the application thereof to said rotor and said valve means is associated with said inlet to said housing.

3. A turbine assembly as in claim 1 or claim 2 wherein said control means includes biasing means applied to opposite sides of said element constructed and arranged to condition said element for a snap action projection thereof in its radially outward movement as said speed of rotation exceeds said predetermined limit to substantially simultaneously therewith trigger the operation of said valve means to substantially restrict the flow of said fluid through said path.

4. Apparatus as in claim 1 or claim 2 wherein said valve means is located in said flow path and conditioned to normally offer a limited resistance to flow of said fluid under pressure to said rotor and normally maintained in an open condition by means operated on by said element in its substantially instantaneous response to the speed of rotation of said rotor exceeding said predetermined limit.

5. Apparatus as in claim 1 wherein said valve means includes a butterfly valve plate mounted in said flow path which has means normally biasing it to a relatively open position, in which position it offers limited resistance to the flow of the fluid under pressure to said rotor and is held against movement toward a closed position under the influence of the fluid upstream thereof by means operating in a substantially instantaneous response to said radially outward movement of said element of said control means to release said valve means for movement thereof to obstruct at least a portion of said flow path.

6. A turbine assembly including a housing, a rotor within said housing having a drive system in connection therewith and forming a part thereof, said rotor being powered by the application thereto of a gaseous fluid under pressure, means defining a flow path for the delivery of said gaseous fluid and the application thereof to power said rotor characterized by valve means, control means in connection with a component part of said drive system comprising a portion thereof having a limited movement relative thereto in response to the speed of its rotation exceeding a predetermined limit and means operating in a substantially instantaneous response to said limited movement of said portion of said control means to provide that said valve means is moved across and to obstruct at least a portion of said flow path sufficiently to diminish the application of said fluid to said rotor and produce an immediate reduction of its speed of rotation and that of its drive system and said component part thereof, said portion of said control means including a hammer element mounted for movement radially of said component part of said drive system and angularly related biasing means applied to normally maintain said hammer element in a radially retracted position to condition it for a snap action outward projection thereof when the speed of rotation of said rotor exceeds said predetermined limit, said hammer element in said radially outward projection thereof providing the element of said portion of said control means which has said limited movement which physically engages a portion of said means operating in a substantially instantaneous response to said limited movement to trigger a condition wherein said valve means is operated to diminish the application of said fluid to said rotor and produce said immediate reduction of its speed of rotation and that of its drive system and said component part thereof.

7. A turbine assembly as in claim 6 embodied in and forming part of a starter for an engine wherein said housing has an inlet and means defining therein and in connection with said inlet a path for flow of said fluid under pressure and the application thereof to said rotor and said valve means is associated with said inlet to said housing.

* * * * *

UNITED STATES PATENT AND TRADEMARK OFFICE
CERTIFICATE OF CORRECTION

PATENT NO. : 4,518,310

DATED : May 21, 1985

INVENTOR(S) : Terry Coons

It is certified that error appears in the above-identified patent and that said Letters Patent is hereby corrected as shown below:

Col. 1, line 23, the comma following "thereof" is deleted.

Col. 2, line 11, "form" is corrected to read -- from --;

line 15, "ahcieve" is corrected to read -- achieve --;

line 33, "off" is corrected to read -- of --.

Col. 3, line 3, "Referring" should start a new paragraph.

Col. 4, line 14, "conincides" is corrected to read -- coincides --.

Col. 5, line 25, "distinguised" is corrected to read -- distinguished --;

line 62, "shart" is corrected to read -- shaft --.

Col. 6, line 16, "mediatedly" is corrected to read -- mediately --;

line 32, "A groove" should start a new Paragraph.

Signed and Sealed this

Twenty-second Day of October 1985

[SEAL]

Attest:

DONALD J. QUIGG

*Attesting Officer*

*Commissioner of Patents and Trademarks—Designate*